United States Patent
Yin

(10) Patent No.: US 7,315,918 B1
(45) Date of Patent: Jan. 1, 2008

(54) PROCESSOR BLOCK PLACEMENT RELATIVE TO MEMORY IN A PROGRAMMABLE LOGIC DEVICE

(75) Inventor: Robert Yin, Castro Valley, CA (US)

(73) Assignee: Xilinx, Inc., San Jose, CA (US)

( * ) Notice: Subject to any disclaimer, the term of this patent is extended or adjusted under 35 U.S.C. 154(b) by 424 days.

(21) Appl. No.: 11/035,776

(22) Filed: Jan. 14, 2005

(51) Int. Cl.
*G06F 12/00* (2006.01)
(52) U.S. Cl. .......................... 711/104; 711/125; 716/16
(58) Field of Classification Search ...................... None
See application file for complete search history.

(56) References Cited

U.S. PATENT DOCUMENTS

| | | | |
|---|---|---|---|
| 5,914,616 A | 6/1999 | Young et al. | |
| 6,522,167 B1 * | 2/2003 | Ansari et al. | 326/39 |
| 7,132,851 B2 | 11/2006 | Young | |
| 2004/0113655 A1 * | 6/2004 | Curd et al. | 326/40 |

OTHER PUBLICATIONS

U.S. Appl. No. 10/683,944, filed Oct. 10, 2003, Young.
Xilinx, Inc.; "Programmable Logic Data Book 2000"; published Apr. 2000; available from Xilinx, Inc.; 2100 Logic Drive, San Jose, California 95124; pp. 3-75 through 3-96.
Xilinx, Inc.; "Virtex II Pro Platform FPGA Handbook"; Oct. 14, 2002; available from Xilinx, Inc.; 2100 Logic Drive, San Jose, California 95124; pp. 19-71.
IBM; "Enhanced PowerPC Architecture"; version 1.0; May 5, 2002. downloaded from http://www-306.ibm.com/chips/techlib/techlib.nsf/techdocs/852569B20050FP778525699600682CC7/$file/booke_rm.pdf.
Xilinx, Inc., "Virtex-II Platform FPGA Handbook", Dec. 6, 2000, pp. 33-75, available from Xilinx, Inc., 2100 Logic Drive, San Jose, California 95124.

* cited by examiner

*Primary Examiner*—Reginald Bragdon
*Assistant Examiner*—Eric Cardwell
(74) *Attorney, Agent, or Firm*—W. Eric Webostad

(57) ABSTRACT

A programmable logic device having groups of data and instruction memory blocks separated by a processor block is described. The processor block including an embedded processor and data and instruction memory controllers. The data and instruction memory blocks respectively including data and memory groupings of block random access memories.

18 Claims, 4 Drawing Sheets

PROCESSOR BLOCK PLACEMENT RELATIVE TO MEMORY IN A PROGRAMMABLE LOGIC DEVICE

FIELD OF THE INVENTION

One or more aspects of the invention relate generally to placement of a processor block relative to memory in a programmable logic device and more particularly, to such placement when the memory is a block random access memory of a programmable logic device.

BACKGROUND OF THE INVENTION

Conventionally, an FPGA includes an array of configurable logic blocks (CLBs) and programmable input/output (I/O) blocks. The CLBs and I/O blocks are interconnected by a programmable interconnect structure that includes a large number of interconnect lines interconnected by programmable interconnect points (PIPs). PIPs are often coupled into groups that implement multiplexer circuits selecting one of several interconnect lines to provide a signal to a destination interconnect line or logic block. Some FPGAs also include additional logic blocks with special purposes, e.g., DLLs, RAM, and so forth.

One such FPGA, the Xilinx Virtex® FPGA, is described in detail in pages 3-75 through 3-96 of the Xilinx 2000 Data Book entitled "The Programmable Logic Data Book 2000" (hereinafter referred to as "the Xilinx Data Book"), published April, 2000, available from Xilinx, Inc., 2100 Logic Drive, San Jose, Calif. 95124, which pages are incorporated herein by reference. Young et al. further describe the interconnect structure of the Virtex FPGA in U.S. Pat. No. 5,914,616, issued Jun. 22, 1999 and entitled "FPGA Repeatable Interconnect Structure with Hierarchical Interconnect Lines", which is incorporated herein by reference in its entirety.

One such FPGA, the Xilinx Virtex®-II FPGA, is described in detail in pages 33-75 of the "Virtex-II Platform FPGA Handbook", published December, 2000, available from Xilinx, Inc., 2100 Logic Drive, San Jose, Calif. 95124, which pages are incorporated herein by reference.

One such FPGA, the Xilinx Virtex®-II Pro™ FPGA, is described in detail in pages 19-71 of the "Virtex-II Pro Platform FPGA Handbook", published October 14, 2002 and available from Xilinx, Inc., 2100 Logic Drive, San Jose, Calif. 95124, which pages are incorporated herein by reference.

FPGAs may further include one or more embedded microprocessors. For example, a microprocessor may be located in an area reserved for it, generally referred to as a "processor block." Location of a processor block to embedded memory, such as block RAM ("BRAM") for example, may negatively impact operation of an FPGA.

Accordingly, it would be desirable and useful to locate a processor block having one or more embedded processors relative to embedded memory to reduce the likelihood of such negative impact.

SUMMARY OF THE INVENTION

One or more aspects of the invention generally relate to placement of a processor block relative to memory in a programmable logic device.

An aspect of the invention is a programmable logic device having an embedded processor, including: a data-side memory controller coupled to the embedded processor; an instruction-side memory controller coupled to the embedded processor; a data-side memory block coupled to the data-side memory controller, where the data-side memory block has at least one data memory group; and an instruction-side memory block coupled to the instruction-side memory controller, where the instruction-side memory block has at least one instruction memory group. The programmable logic device has a columnar architecture, wherein the data-side memory block, the instruction-side memory block and the embedded processor all span one or more columns of the programmable logic device. The embedded processor located between the data-side memory block and the instruction-side memory block. The instruction-side memory block and the data-side memory block formed from a double-wide block random access memory column. The at least one data memory group includes at least four block random access memories of the double-wide block random access memory column in a two-by-two array thereof. The at least one instruction memory group includes at least two block random access memories of the double-wide block random access memory column in a one-by-two array thereof. A central point of the programmable logic device not encompassed by a processor block in which the embedded processor, the data-side memory controller and the instruction-side memory controller are located.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items, however, in alternative embodiments the items may be different.

Figure 1:
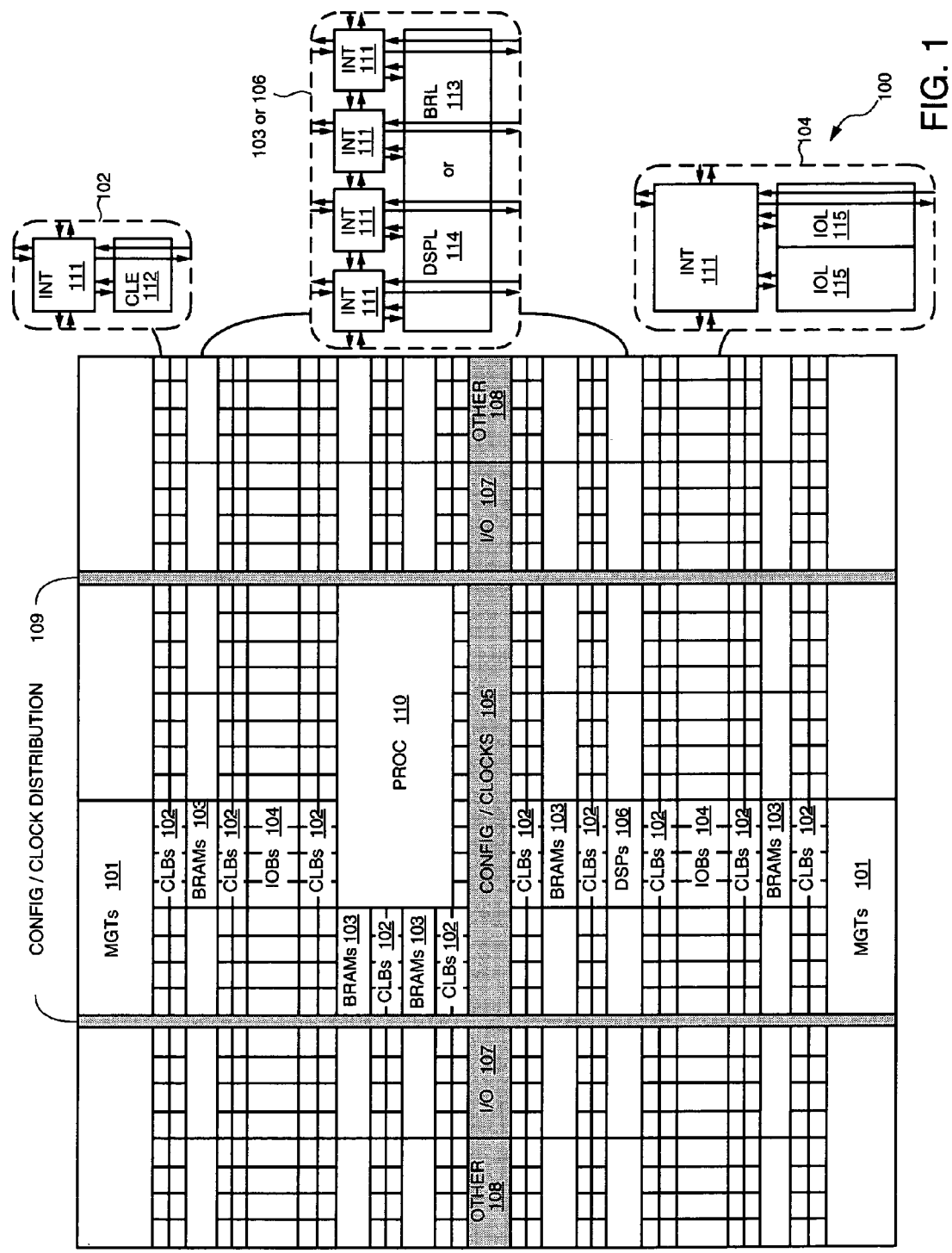
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic. Additional details regarding a columnar architected FPGA may be found in a co-pending patent application, namely, U.S. patent application Ser. No. 10/683,944 entitled, "Columnar Architecture" by Steve P. Young, filed Oct. 10, 2003, which is incorporated by reference herein in its entirety.

FPGA 100 illustratively represents a columnar architecture. Asymmetrical placement of processor block 110 relative neighboring BRAMs 103, as well as to FPGA 100, is further described with reference to FIG. 2, where there is shown a simplified block diagram depicting an exemplary embodiment of a processor block 110 coupled to blocks of memory ("memory blocks") 231 and 232.

Figure 2:
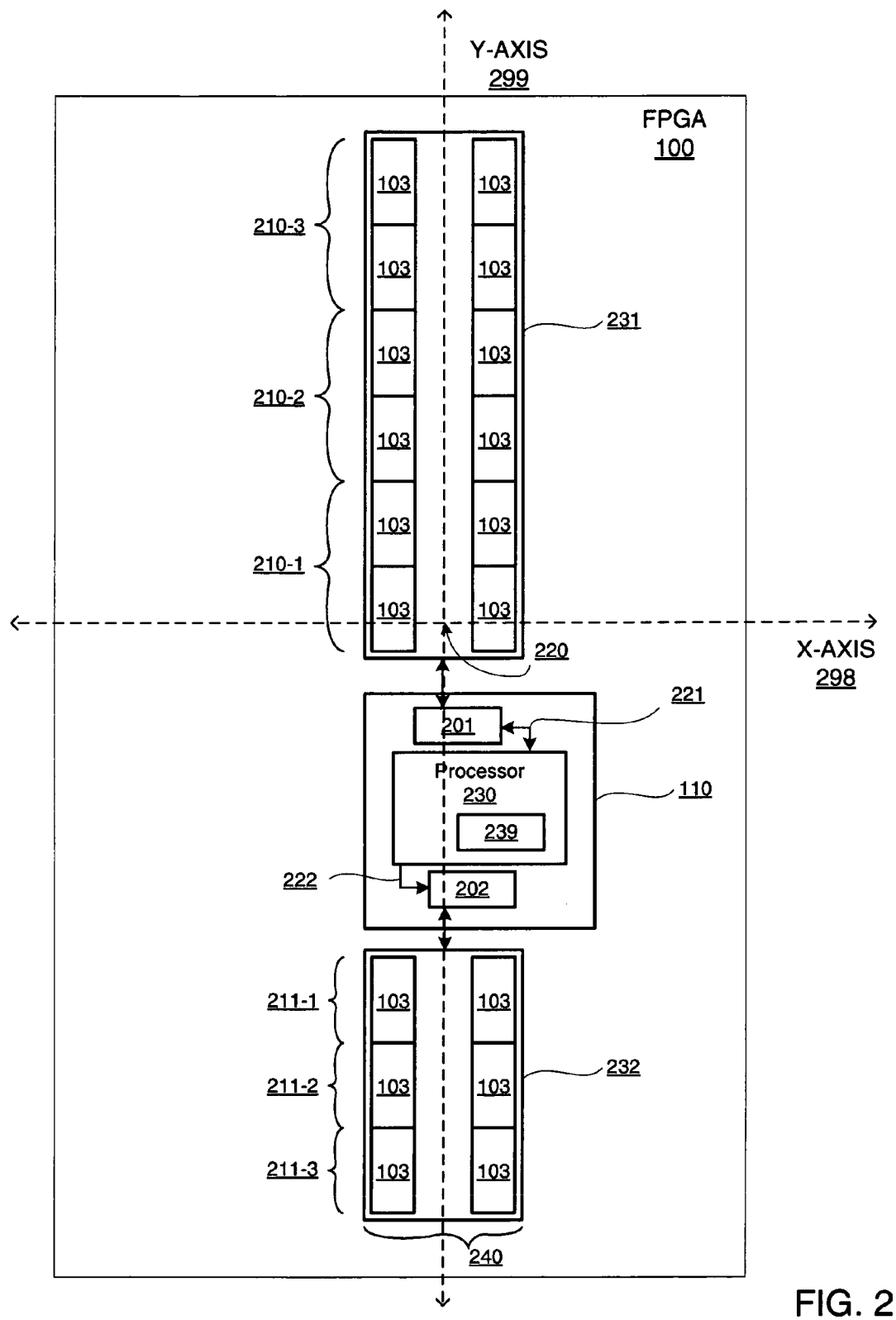
FIG. 2 is a simplified block diagram depicting an exemplary embodiment of a processor block coupled to blocks of memory.

In FIG. 2, processor block 110 is coupled to memory blocks 231 and 232 of BRAMs 103. Notably, though only one processor block 110 is illustratively shown in FIG. 2 for FPGA 100, FPGA 100 may have more than one processor block 110. Moreover, though only one processor 230 is illustratively shown, more than one processor 230 may be in a processor block 110.

In processor block 110 is data-side on-chip memory ("DSOCM") controller 201, instruction-side on-chip memory ("ISOCM") controller 202, and processor 230, such as a PowerPC 405 core microprocessor. More details regarding a PowerPC processor core may be found in a publication entitled "Enhanced PowerPC Architecture" version 1.0 dated May 7, 2002 from IBM, which is incorporated by reference herein in its entirety. Processor 230 is coupled to DSOCM controller 201 and to ISOCM controller 202. DSOCM controller 201 and ISOCM controller 202 are forms of memory controllers. Notably, it should be understood that processor 230 has separate data and instruction on-chip memory controllers, namely DSOCM controller 201 and ISOCM controller 202 respectively, which are accessible by processor 230 via separate local memory buses, namely local memory bus 221 and local memory bus 222.

DSOCM controller 201 is coupled to data-side memory block 231. ISOCM controller 202 is coupled to instruction-side memory block 232. Notably, placement of processor block 110 is asymmetrical with respect to a horizontal central axis 298 ("X-axis") and a vertical central axis 299 ("Y-axis") of FPGA 100. More particularly, processor block 110 is located entirely below X-axis 298. Furthermore, processor block 110 is offset to the right with respect to Y-axis 299, though processor block 110 may be centrally disposed with respect to Y-axis 299. Accordingly, it should be appreciated that processor block 110 may be positioned within FPGA 100 such that no portion of processor block 110 includes a center point 220 of FPGA 100.

Processor block 110 is placed to take into consideration of operation and location of DSOCM controller 201 and ISOCM controller 202, as well as routing characteristics of FPGA routing fabric, relative to data-side memory block 231 and instruction-side memory block 232. By placing data-side memory block 231 and instruction-side memory block 232 in close proximity to processor block 110, a substantial amount of embedded BRAM is available to processor 230 with reduced interconnect delays with respect to programmably configurable routing and other programmably configurable circuitry ("fabric") of FPGA 100. Alternatively, BRAM blocks 231 and 232 could be located in other than near proximity to processor block 110, though this may slow processor 230 performance.

A double-wide column of BRAM blocks 103, namely BRAMs 103, may be implemented in near proximity to processor block 110, namely disposed within one or more columns 240 of a columnar architecture FPGA 100. Placement of processor block 110 in the Y-direction is offset from center 220 in the vertical direction to allow for a multiple of two BRAMs 103 for a height of data-side memory block 231. For an exemplary implementation, a thirty-two-bit wide data bus, excluding parity bits for purposes of clarity, on a data-side of processor 230 may be implemented, where BRAM groupings 210-1 through 210-3 each are a two-by-two array of BRAMs 103. Accordingly, each BRAM may be configured to accept one byte width of data at a time, and thus four BRAMs so configured and concatenated provide a four-byte-wide data bus. Though three groups 210-1 through 210-3 are shown, it should be understood that fewer or more than three groups of BRAMs 103 may be implemented. Furthermore, the number of BRAMs 103 within a group is dependent upon data bus width implemented, and accordingly is not limited to a thirty-two-bit wide data bus as it may be smaller or larger than such a bus width.

It should be understood that BRAMs are accessible in a byte size when they are configured in a word size. As a result, each BRAM can provide 512 words by 32 bits. However, when a large amount of memory is to be employed, such as a multiple of 2048 words for example, a group of four BRAMs are employed as described herein. Thus, a group of four BRAMs is a suitable amount for 2048 words. A group of four BRAMs with double column of BRAMs means a two block tall BRAM group.

It should be appreciated that an embedded processor block 110 takes up a considerable amount of area of an FPGA 100, thereby limiting the amount of space available for additional circuits within the same columns. Moreover, interaction between an embedded processor 230, such as a PowerPC, and DSOCM controller 201 or ISOCM controller 202 with other embedded circuit blocks, such as BRAMs 103 and logic in FPGA fabric, means that placement of processor block 110 in FPGA 100 may have a significant impact on overall performance of a system implemented in FPGA 100. In this exemplary implementation, processor block 110 is placed such that DSOCM controller 201 and ISOCM controller 202 can reduce the impact of slow-routing connections to BRAMs 103 in FPGA fabric.

For example, processor block 110 is placed such that processor 230 may have fewer wait states when operating at a maximum speed thereof when accessing BRAMs 103. By placing BRAMs 103 of memory blocks 231 and 232 in close proximity to processor block 110 within one or more columns 240, delay due to FPGA fabric interconnect wiring, particularly when a large number of BRAMs 103 are to be accessed, may be reduced. By placing a maximum number of BRAMs in an addressable group within one or more columns 240 in near proximity to processor block 110, and in particular in near proximity to DSOCM controller 201 and ISOCM controller 202, memory access time may be reduced. In other words, overall memory access time may be reduced.

Each grouping 210-1 through 210-3 and 211-1 through 211-3 has an associated maximum memory access time as a function of signal propagation delay. A double-wide BRAM column group 210-1, for example, will have a faster maximum memory access time than group 210-2 for equivalent configurable routing resources. Furthermore, memory access time for a group, such as group 210-1, may be faster than memory access time for a single column of BRAMs 103 four blocks tall, as the taller grouping would be farther away from processor 230.

Each grouping 210 and 211 will have an associated memory access time lag determined by the longest interconnect delay time of a BRAM 103 in a group 210 or 211. Memory access time for a group may be cut in approximately half as compared with a single column of BRAMs. Notably, total access time includes two components: memory access time and interconnect delay time. By using a double-wide column of BRAMs, interconnect delay time may be halved compared to a single column of BRAMs. In a system where a large number of BRAM groups 210 are used, interconnect delay time dominates total access time, and thus by reducing, such as halving for example, the interconnect delay time, total access time my be substantially reduced, such as approximately cut in half for example. Furthermore, providing a double-wide column of BRAMs 103 within a column 240 may fit within a pitch of processor block 110. It should be understood that data memory grouping 210 and instruction memory grouping 211 are respectively positioned on opposing sides of processor block 110 in one or more columns 240.

Continuing the example of four-byte width data access, DSOCM controller 201 allows processor 230 to access each byte of data from data-side memory block 231. Since each data word width consumes four bytes, use of BRAM groups 210-1 through 210-3, or a portion thereof, of four BRAMs 103 each, facilitates memory depth for 32-bit data words. A conventional BRAM contains approximately 18,000 bits and may be configured for 9 bits by 2048 bits, where one of the bits may be used as a parity bit. By allocating a group of two consecutive BRAMs 103 in the vertical direction 299 to provide a multiple of four BRAMs per group, such as BRAM group 210-1, a multiple of four BRAMs is accessible at a time by processor 230 without having to access BRAM outside of one or more columns 240.

ISOCM controller 202 includes an instruction bus which in the exemplary implementation is eight bytes wide, excluding parity bits for purposes of clarity. Accordingly, eight bytes of information may be accessed at a time by ISOCM controller 202 responsive to processor 230, though an instruction may be shorter than the entire available instruction word length. A double-wide BRAM column 240 facilitates connecting two BRAMs 103 together to provide eight bytes of instruction information at an access. Accordingly, it should be understood that instruction-side BRAM groups 211-1 through 213-3 do not have the same constraints, such as having pairs of BRAMs 103 in a vertical direction, as data-side BRAM groups 210-1 through 210-3. For example, in a PowerPC 405 core implementation, one instruction-cache line of an instruction cache 239 within a PowerPC 405 core is 8 words long. Though three groups each of data-side and instruction-side BRAM groups are illustratively shown, fewer or more of such groups may be implemented in a double-wide BRAM column 240 in which processor block 110 is located between such groups with respect to a vertical direction 299.

Notably, the number of memory groups 210 and 211 need not favor one group or the other, or may favor one group over another. For example, if the instruction set is substantially large, there may be more instruction-side memory groups 211 than data-side memory groups 210. Alternatively, if the instruction set is relatively small, there may be fewer instruction-side memory groups 211 than data-side memory groups 210. Accordingly, processor block 110 may be entirely located above or below X-axis 298 depending on which group is favored. Notably, processor block 110 placement cannot be dynamically changed, i.e., its placement is determined in advance according. This placement however may be determined at least in part due to market factors. Placement of processor block is the same for each member of a family of FPGAs, or other programmable logic devices. However, as noted, one member of a family can favor one group, either 210 or 211, over another, and another family member can be the opposite according to respond to a target market.

Figure 3A:
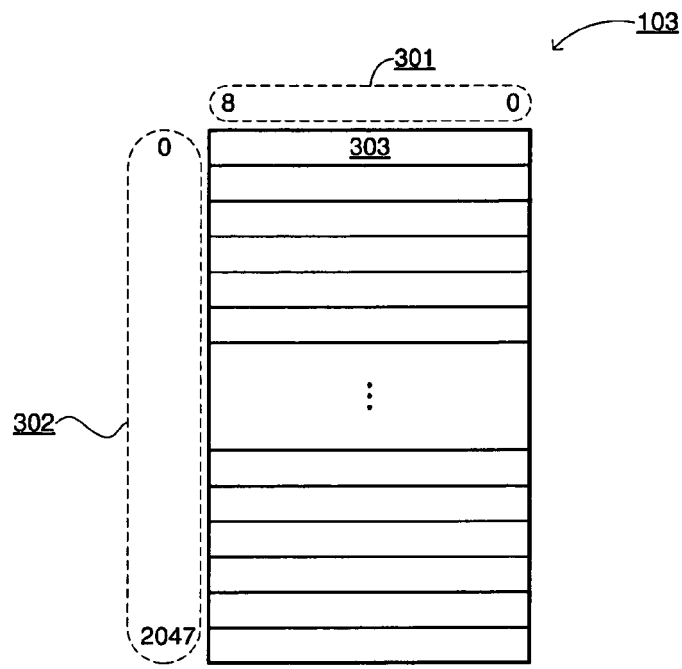
FIG. 3A is a simplified block diagram depicting an exemplary embodiment of mapped column and row addresses of a block of memory used for data storage.

FIG. 3A is a simplified block diagram depicting an exemplary embodiment of mapped column and row addresses of a BRAM 103 used for data storage. Column data 301 are from bit 0 to bit 8 for a one-byte data wide input width with an extra bit which may be used as a parity check bit for example. Row addresses 302 are from bit 0 to bit 2047. Notably, a parity bit may be omitted, namely removal of the memory cell in the configuration of BRAM 103, or unused. Notably, a quarter 303 of a 32-bit data word may be stored in a row of a BRAM 103 in an FPGA used for data storage.

Figure 3B:
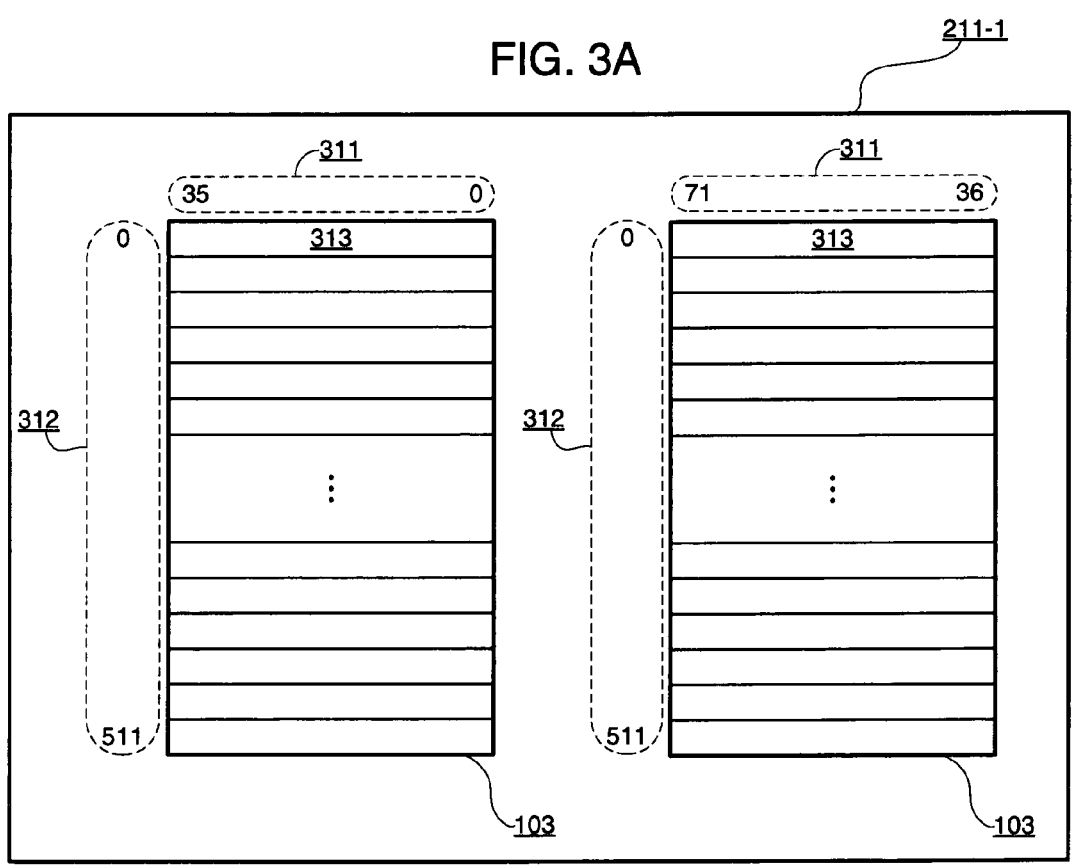
FIG. 3B is a simplified block diagram depicting an exemplary embodiment of mapped column and row addresses of a group of memory blocks used for instruction storage.

FIG. 3B is a simplified block diagram depicting an exemplary embodiment of mapped column data and row addresses of a memory group 211-1 of BRAMs 103 used for storage of instructions. Column data 311 for a BRAM 103 are from bit 0 to bit 35 for a one-half of an instruction input width with 4 extra bits which may be used as parity check bits for example and, for another BRAM 103 in memory group 211-1, are from bit 36 to bit 71 for another one-half of an instruction input width with 4 extra bits which may be used as parity check bits for example. Row addresses 312 are from bit 0 to bit 511. Notably, a parity bit may be omitted, namely removal of the memory cell in the configuration of BRAM 103, or unused. Notably, a half 313 of a 64-bit instruction word may be stored in a row of a BRAM 103, and a 64-bit instruction word may be stored in a combined row of BRAMs 103 in a group 211-1.

Figure 4:
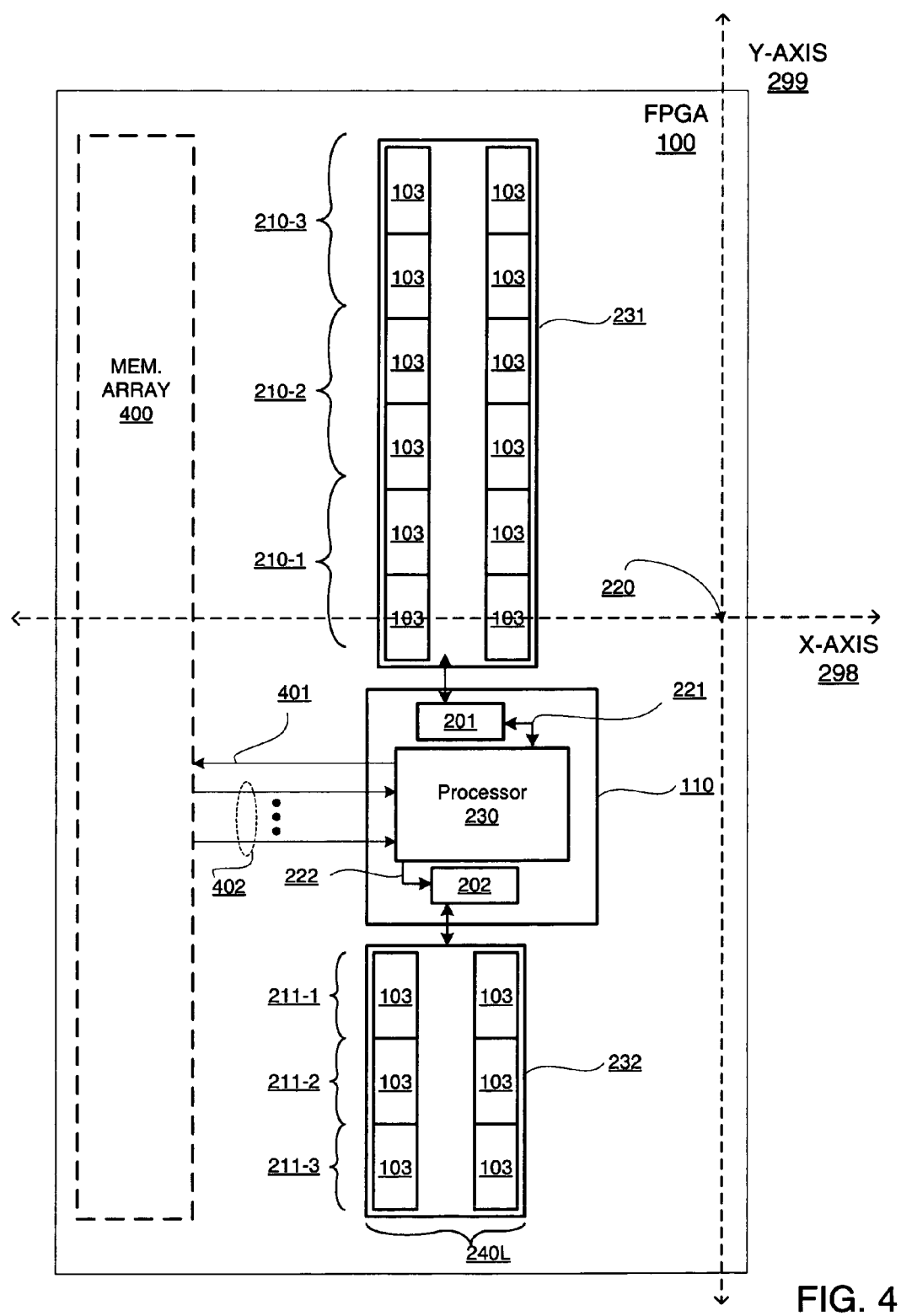
FIG. 4 is a simplified block diagram depicting an exemplary embodiment of a processor block coupled to blocks of memory in a column that is positioned in near proximity to a high-density memory array.

FIG. 4 is a simplified block diagram depicting an exemplary embodiment of a processor block 110 coupled to blocks of memory 231, 232 in a column 240L that is positioned in near proximity to a high-density memory array 400. High-density memory array 400 may be formed of memory cells used for embedded memory, including but not limited to dynamic random access memory cells and flash memory cells, among other known high-density embeddable array of memory cells.

Column 240L in FIG. 4 is similar to one or more columns 240 in FIG. 2, except column 240L is shifted to the left. It should be understood that in one embodiment of an FPGA columnar architecture, signal propagation may be biased in favor of one direction, such as a left-to-right direction, over another direction, such as a right-to-left direction. Accordingly, more interconnectivity may exist in the direction of signal propagation bias.

In the exemplary implementation of FIG. 4, processor block 110 coupled to blocks of memory 231, 232 is positioned on the right side of optional memory array 400. Moreover, processor block 110 coupled to blocks of memory 231, 232 may be located in near proximity to memory array 400. Processor 230 of processor block 110 may be coupled to memory array 400 via processor local memory buses 401 and 402. It should be understood that FPGA 100 may have a bias in signal routing, such as more left to right signal routes than right to left signal routes.

A left-side placement of memory array 400 and processor block 110 may be used to enhance performance by increased availability of left-to-right signal routings of FPGA 100. In other words, processor 230 signal connectivity to memory array 400 in a write direction, namely from right to left, is generally less demanding than a read direction, namely from left to right. Thus, by placing processor block 110 to the right of memory array 400 signal interconnectivity is facilitated and thus memory read performance may be enhanced. For example, there may be one write bus 401 from processor 230 to memory array 400 for each more than one read bus 402 from memory array 400 to processor 230. In other words, memory array 400 may be a multi-ported, where there is one write port for multiple read ports. Moreover, by placing processor 230 in close proximity to memory array 400, the number of wait states for memory access, read or write, may be reduced by reducing interconnect wire length and thus delays associated therewith. Notably, the directions may be reversed, namely there may be more signal routings in the right to left direction than in the left to right direction, in which embodiment embedded processor 230 may be located to the right of memory array 400.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A programmable logic device having an embedded processor, comprising:

a data-side memory controller coupled to the embedded processor;

an instruction-side memory controller coupled to the embedded processor;

a data-side memory block coupled to the data-side memory controller, the data-side memory block including at least one data memory group;

an instruction-side memory block coupled to the instruction-side memory controller, the instruction-side memory block including at least one instruction memory group;

the programmable logic device having a columnar architecture, wherein the data-side memory block, the instruction-side memory block and the embedded processor all span one or more columns of the programmable logic device;

the embedded processor being located between the data-side memory block and the instruction-side memory block;

the instruction-side memory block and the data-side memory block being formed from a double-wide block random access memory column;

the at least one data memory group composed of at least four block random access memories of the double-wide block random access memory column in a two-by-two array thereof;

the at least one instruction memory group composed of at least two block random access memories of the double-wide block random access memory column in a one-by-two array thereof;

a central point of the programmable logic device not being encompassed by a processor block in which the embedded processor, the data-side memory controller and the instruction-side memory controller are located; and wherein the at least one data memory group and the at least one instruction memory group are respectively located on opposing sides of the processor block.

2. The programmable logic device, according to claim 1, wherein the at least one instruction memory group is part of a plurality of instruction memory groups, and wherein the at least one data memory group is part of a plurality of data memory groups.

3. The programmable logic device, according to claim 2, further comprising a memory array apart from the at least one instruction memory group and the at least one data memory group, the memory array coupled to the embedded processor with one write port for each plurality of read ports, wherein the embedded processor is positioned relative to the memory array for more signal routing of the programmable logic device in a read direction than in a write direction.

4. The programmable logic device, according to claim 2, wherein the plurality of instruction memory groups is greater in number than the plurality of data memory groups.

5. The programmable logic device, according to claim 2, wherein the plurality of instruction memory groups is less in number than the plurality of data memory groups.

6. The programmable logic device, according to claim 2, wherein the processor block is disposed in a Field Programmable Gate Array.

7. The programmable logic device, according to claim 6, wherein the processor block is asymmetrically located with respect to a central horizontal axis of the Field Programmable Gate Array.

8. The programmable logic device, according to claim 7, wherein the processor block is asymmetrically located with respect to a central vertical axis of the Field Programmable Gate Array.

9. The programmable logic device, according to claim 7, wherein each block random access memory of the at least four block random access memories is configured with approximately a one byte wide data input.

10. The programmable logic device, according to claim 9, wherein the one byte wide data input for the at least four block random access memories in combination provides approximately a 32-bit wide data bus.

11. The programmable logic device, according to claim 9, wherein each of the at least four block random access memories are configured in word size.

12. The programmable logic device, according to claim 11, wherein the at least four block random access memories provide storage capacity of a multiple of 2048 data words.

13. The programmable logic device, according to claim 7, wherein each block random access memory of the at least two block random access memories is configured with approximately a four byte wide instruction input.

14. The programmable logic device, according to claim 13, wherein the four byte wide instruction input for the at least two block random access memories in combination provides approximately a 72-bit wide instruction bus.

15. The programmable logic device, according to claim 14, wherein the at least two block random access memories provide storage capacity of a multiple of 512 instructions.

16. The programmable logic device, according to claim 15, wherein the embedded processor comprises an instruction cache.

17. The programmable logic device, according to claim 16, wherein the instruction cache has a 72-bit wide instruction storage interface.

18. The programmable logic device, according to claim 7, wherein the Field Programmable Gate Array having the columnar architecture provides the double-wide block random access memory column has the at least one data memory group positioned on a side of the opposing sides associated with location of the data-side memory controller and has the at least one instruction memory group positioned on another side of the opposing sides associated with location of the instruction-side memory controller.

* * * * *